(12) United States Patent
Moore

(10) Patent No.: US 12,693,010 B2
(45) Date of Patent: Jul. 28, 2026

(54) APPARATUS AND METHOD FOR COMBUSTION OF NATURAL GAS FROM PNEUMATIC CONTROLLERS

(71) Applicant: Derek L. Moore, Greeley, CO (US)

(72) Inventor: Derek L. Moore, Greeley, CO (US)

( * ) Notice: Subject to any disclaimer, the term of this patent is extended or adjusted under 35 U.S.C. 154(b) by 621 days.

(21) Appl. No.: 18/342,413

(22) Filed: Jun. 27, 2023

(65) Prior Publication Data

US 2023/0349552 A1     Nov. 2, 2023

Related U.S. Application Data

(62) Division of application No. 17/864,824, filed on Jul. 14, 2022, now Pat. No. 11,713,879.

(60) Provisional application No. 63/225,807, filed on Jul. 26, 2021.

(51) Int. Cl.
| | |
|---|---|
| *F23G 7/08* | (2006.01) |
| *F16K 31/126* | (2006.01) |
| *F24H 15/40* | (2022.01) |
| *F24H 1/00* | (2022.01) |

(52) U.S. Cl.
CPC ............ *F23G 7/08* (2013.01); *F16K 31/1262* (2013.01); *F16K 31/1266* (2013.01); *F24H 15/40* (2022.01); *F24H 1/0027* (2013.01)

(58) Field of Classification Search
USPC .............................................. 431/5
See application file for complete search history.

(56) References Cited

U.S. PATENT DOCUMENTS

| | | | | | |
|---|---|---|---|---|---|
| 4,295,505 | A | * | 10/1981 | Hasselmann .......... | B67D 7/048 |
| | | | | | 251/282 |
| 5,766,313 | A | * | 6/1998 | Heath .................. | B01D 53/263 |
| | | | | | 96/182 |
| 2015/0211739 | A1 | * | 7/2015 | Loveless ................. | F23N 5/247 |
| | | | | | 137/544 |
| 2016/0018826 | A1 | * | 1/2016 | Koulogianes ............. | F17D 1/04 |
| | | | | | 137/12 |

* cited by examiner

*Primary Examiner* — Steven B Mcallister
*Assistant Examiner* — John E Bargero
(74) *Attorney, Agent, or Firm* — Samuel M. Freund; Cochran Freund & Young LLC

(57)     ABSTRACT

Apparatus and method for capturing and combusting all vented natural gas and controlling natural gases from pneumatic controllers for oil field equipment are described. After an oil or gas well is drilled and completed, separators or treaters, as an example of oil field equipment, are installed on the surface to separate the liquids (oil/condensate and water) and gases (natural gas/methane). Pressure control valves, liquid control valves, temperature control valves, and the like, are pneumatically operated by the natural gas/methane that the separator is processing for sale, when electricity is not available to provide power for these operations. Presently, the pneumatic controllers discharge the pneumatic gas/methane to the atmosphere.

3 Claims, 5 Drawing Sheets

APPARATUS AND METHOD FOR COMBUSTION OF NATURAL GAS FROM PNEUMATIC CONTROLLERS

CROSS-REFERENCE TO RELATED APPLICATIONS

The present application is a Divisional of U.S. Non-Provisional patent application Ser. No. 17/864,824 for "Apparatus for Combustion of Natural Gas from Pneumatic Controllers" which claims the benefit of U.S. Provisional Patent Application No. 63/225,807 for "Apparatus for Combustion of Natural Gas from Pneumatic Controllers" by Derek L. Moore, which was filed on Jul. 26, 2021, the entire content of which applications is hereby specifically incorporated by reference herein for all that it discloses and teaches.

BACKGROUND

Natural gas is primarily made up of methane, with low concentrations of other hydrocarbons, water, carbon dioxide, nitrogen, oxygen, and some sulfur compounds. It is often trapped within impermeable shale formations and other types of sedimentary rock, or held in rock pores. Horizontal drilling and hydraulic fracturing or tracking is used to break open rock to release the natural gas, and involves pumping fluids into a well at high pressure typically at depths of greater than a kilometer. These fluids comprise about 99% sand and water, with about 1% of added chemicals for assisting the gas to flow more freely. In conventional natural gas extraction, namely, from oil and gas wells, the natural gas generally readily flows through a well to the surface.

When a well is produced, a mixture of oil, water, gas, and solids is brought to the surface. After the gas has been separated from the liquid, the mixture of oil and water that remains must also be separated. Heating the liquid to a chosen temperature enhances separation since, as the temperature of an oil and water to be more easily released by the oil. Heating oil emulsions also increases the density difference between oil and water.

Since oil and water have different densities, the water in the mixture can separate by the action of gravity. In a non-turbulent condition, and with sufficient time, the different density liquids will naturally separate. Gravity separation is the most widely used method for separation of oil/water emulsions.

SUMMARY

In accordance with the purposes of the present invention, as embodied and broadly described herein, an embodiment of the apparatus for combusting natural gas released from at least one natural gas-pressure-operated pneumatic controller, the at least one natural gas-pressure-operated pneumatic controller providing natural gas control pressure for operating natural gas-operated equipment, hereof, includes: a source of natural gas having a first pressure; a first natural gas regulator for receiving natural gas from the source of natural gas, and for controlling the flow thereof into the at least one natural gas-pressure-operated pneumatic controller; a second natural gas regulator for receiving natural gas from the source of natural gas for reducing the first pressure of natural gas to a chosen pressure; a third natural gas regulator for receiving the chosen pressure of natural gas from the second natural gas regulator; a gas-tight chamber having a first gas inlet for continuously introducing natural gas from the third natural gas regulator, and a second natural gas inlet for receiving natural gas released from the at least one natural gas-pressure-operated pneumatic controller, each of the first gas inlet and the second gas inlet having a check valve for directing natural gas flow into the gas-tight chamber; a gas-pressure relief valve, and a natural gas outlet port; a natural gas burner for receiving natural gas from the natural gas outlet port, and for combusting the natural gas; a quick exhaust valve having an exhaust port in fluid communication with natural gas released from the at least one gas-pressure-operated pneumatic controller, and in fluid communication with the second natural gas inlet of the gas-tight chamber, an inlet port in fluid communication with natural gas control pressure provided by the at least one natural gas-pressure-operated pneumatic controller, and an outlet port; and a gas control valve for providing natural gas to the natural gas-operated equipment from the second natural gas regulator, the gas control valve having a diaphragm disposed between a first gas-tight chamber and a second gas-tight chamber, a stem having a valve plug at one end, and a valve seat adapted to receive the valve plug disposed in the first chamber, and a spring disposed in the second chamber, the spring pressing against the diaphragm for engaging the valve plug with the valve seat, being counteracted by the natural gas control pressure from the gas-pressure-operated pneumatic controller in fluid communication with the inlet port of the quick exhaust valve, the first chamber being in fluid communication with the outlet port of the quick exhaust valve, whereby the flow of natural gas through the gas control valve is controlled; the second chamber being in fluid communication with the exhaust port of the quick exhaust valve and the natural gas released from the at least one gas-pressure-operated pneumatic controller, for augmenting the spring pressing against the diaphragm.

In another aspect of the present invention and in accordance with its purposes, as embodied and broadly described herein, an embodiment of the method for combusting natural gas released from at least one natural gas-pressure-operated pneumatic controller, the at least one natural gas-pressure-operated pneumatic controller providing natural gas control pressure for gas-pressure operated equipment, hereof, includes: introducing natural gas, and introducing released natural gas and control pressure natural gas from the at least one gas-pressure operated pneumatic controller into a gas-tight chamber; controlling the flow of natural gas into and out of the gas-tight chamber; combusting natural gas flowing out of the gas-tight chamber; providing natural gas pressure to the at least one natural gas-pressure-operated pneumatic controller; providing natural gas to the natural gas-pressure operated processing equipment through a gas-pressure-operated gas control valve having a diaphragm disposed between a first gas-tight chamber and a second gas-tight chamber, a stem having a valve plug at one end and a valve seat adapted to receive the valve plug disposed in the first chamber, and a spring disposed in the second chamber for pressing against the diaphragm for engaging the valve plug and the valve seat; opening the diaphragm control valve using natural gas control pressure from the at least one gas-pressure-operated pneumatic controller directed into the first chamber thereof; and closing the diaphragm control valve by reducing the natural gas control pressure and directing natural gas released from the at least one gas-pressure-operated pneumatic controller into the second chamber.

In accordance with the purposes of the present invention, as embodied and broadly described herein, another embodiment of the apparatus for combusting natural gas released from at least one natural gas-pressure-operated pneumatic controller, the at least one natural gas-pressure-operated pneumatic controller providing natural gas control pressure for operating natural gas-operated equipment, hereof, includes: a source of natural gas having a first pressure; a first natural gas regulator for receiving natural gas from said source of natural gas, and for controlling the flow thereof into the at least one natural gas-pressure-operated pneumatic controller; a second natural gas regulator for receiving natural gas from the source of natural gas for reducing the first pressure of natural gas to a chosen pressure; a third natural gas regulator for receiving the chosen pressure of natural gas from the second natural gas regulator; a gas-tight chamber having a first gas inlet for continuously introducing natural gas from the third natural gas regulator, and a second natural gas inlet for receiving natural gas released from the at least one natural gas-pressure-operated pneumatic controller, each of the first gas inlet and said second gas inlet having a check valve for directing natural gas flow into the gas-tight chamber; a gas-pressure relief valve, and a natural gas outlet port; a natural gas burner for receiving natural gas from the natural gas outlet port, and for combusting the natural gas; and a gas control valve for providing natural gas to the natural gas-operated equipment from the second natural gas regulator, the gas control valve having a diaphragm disposed between a first gas-tight chamber and a second gas-tight chamber, a stem having a valve plug at one end, and a valve seat adapted to receive the valve plug disposed in the first chamber, and a spring disposed in the second chamber, the spring pressing against the diaphragm for engaging the valve plug with the valve seat, being counteracted by the natural gas control pressure from the gas-pressure-operated pneumatic controller in fluid communication with the first gas-tight chamber, whereby the flow of natural gas through the gas control valve is controlled; the second gas-tight chamber being in fluid communication with the natural gas released from the at least one gas-pressure-operated pneumatic controller, for augmenting the spring pressing against the diaphragm.

In accordance with the purposes of the present invention, as embodied and broadly described herein, the fluid control valve, hereof, includes: a fluid inlet port; a fluid outlet port; a diaphragm disposed between a first gas-tight chamber and a second gas-tight chamber; a stem having a valve plug at one end, the second end of the stem being attached to the diaphragm disposed in the first gas-tight chamber; a valve seat adapted to receive the valve plug disposed in the first gas-tight chamber between the fluid inlet port and said fluid outlet port; a spring disposed in the second chamber for exerting force against the diaphragm for engaging the valve plug with said valve seat; a first source of gas having a first pressure in fluid communication with the first gas-tight chamber, gas pressure in the first gas-tight chamber produced thereby counteracting the force on the diaphragm by the spring; and a second source of gas in fluid communication with the second gas-tight chamber for augmenting the force on said diaphragm by the spring; whereby fluid flowing between the fluid inlet port and the fluid outlet port is controlled.

Benefits and advantages of the present invention include, but are not limited to, apparatus and method for capturing and combusting vented natural gas from pneumatic controllers for oilfield equipment, wherein use of the combination of a quick release valve with a burner control valve, as an example, permits the control pressure of the control valve to be raised to the chosen pressure of a gas collection chamber, and the larger volume of the burner control valve provides additional volume for the venting gas, thereby permitting smooth transfer of the venting gas into the collection chamber without over pressurizing the chamber, and causing unburned gas to be released into the atmosphere.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, embodiments of the present invention include apparatus for capturing and combusting vented natural gas from pneumatic controllers for oilfield equipment.

As an example, after an oil or gas well is drilled and completed, separators or treaters are installed on the surface to separate the liquids (oil/condensate and water) and gases (natural gas/methane). Pressure control valves, liquid control valves, temperature control valves, and the like, are pneumatically operated by the natural gas/methane that the separator is processing for sale, when electricity is not available to provide power for these operations. These pneumatic devices operate continually and randomly over the life of the well, and hundreds of thousands of actuations (openings and closings) occur in a normal separator as it processes the fluid from the well. Presently, the pneumatic controllers discharge the pneumatic gas/methane to the atmosphere and reset for the next cycle when a separation cycle has been completed. State environmental regulations cover such vented gases, and energy companies are seeking economical solutions to assist in compliance.

Figure 1:
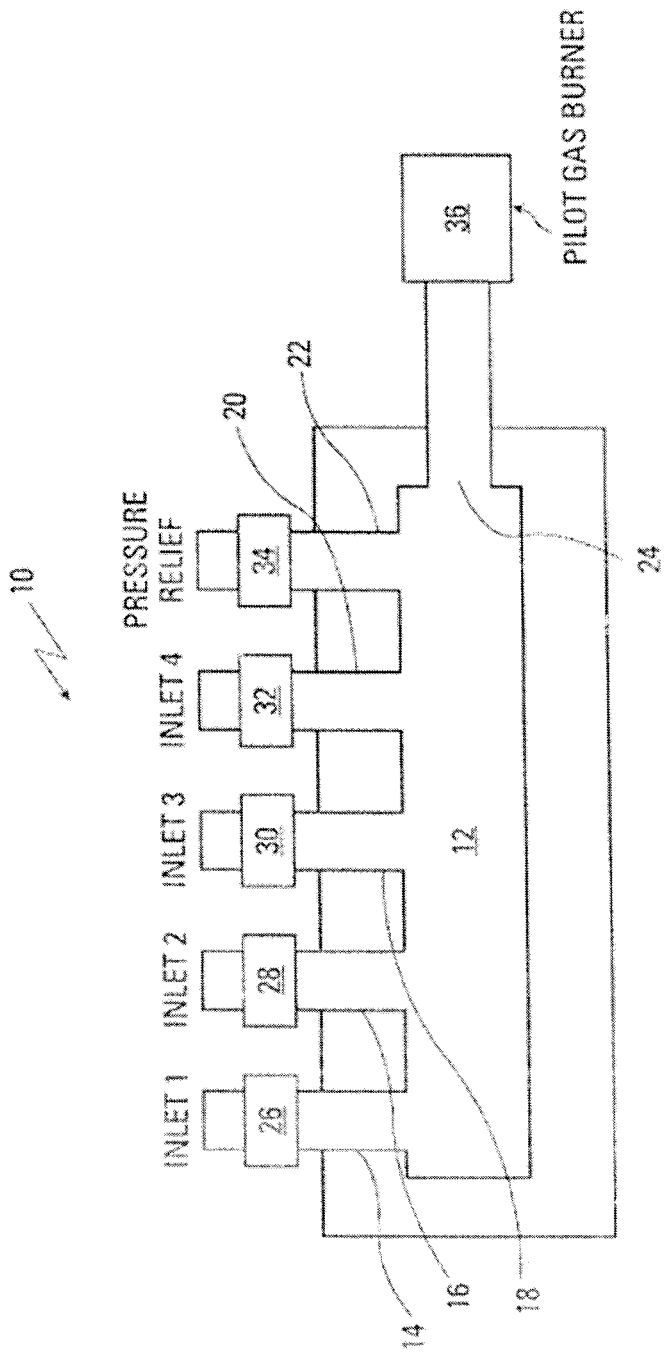
FIG. 1 is a schematic representation of the present vent gas collection manifold including a gastight hollow chamber having inlet ports each having an in-line check valve for preventing gas in the chamber from exiting except through a pressure relief valve, or an exit port that directs gases into a gas burner for combustion, one of the vent inlet ports being dedicated to introducing pilot gas into the chamber, such that a gas burner functions as a pilot gas burner until gas from the oil field equipment is present.

Reference will now be made in detail to the present embodiments of the invention, examples of which are illustrated in the accompanying drawings. In the FIGURES, similar structure will be identified using identical reference characters. It will be understood that the FIGURES are presented for the purpose of describing particular embodiments of the invention and are not intended to limit the invention thereto. Turning now to FIG. 1 a schematic representation of vent gas collection manifold, 10, which includes gastight hollow chamber, 12, shown having ports, 14, 16, 18, 20, 22, and 24, the exact number of inlet ports 14-20 depending on the number of processing equipment vents requiring gas disposal. Each vent inlet port 14, 16, 18, and 20, has an in-line check valve, 26, 28, 30, and 32, respectively, with a 1±1 psi cracking pressure, for preventing gas in chamber 12 from exiting except through port 22 and pressure relief valve, 34, or through exit port 24, which directs gases into gas burner, 36, for combustion. One of the vent inlet ports 14-20 is dedicated to introducing pilot gas into chamber 12, whereby gas burner 36 functions as a pilot gas burner until gas from the oil field equipment is present. Pressure relief port 22, having vent valve 34, controls the pressure in chamber 12 to 15±2 psi, in the event that gas in chamber 12 cannot be evacuated through burner orifice 24. Such a situation may arise if entrance orifice 24 to gas burner 36 becomes blocked, or if a pneumatic valve remains open sending a constant 25 psi of gas into chamber 12. This latter situation may exceed the capability of gas burner 36 to evacuate chamber 12. If the valve pressures are too high and cannot be lowered, as will be discussed in more detail below, a small volume tank may be placed in the gas line to lower the high pressures, while the pilot burner processes the gases.

One vent inlet is dedicated to one pneumatic controller or regulator in order that vent gas exhausted from one controller does not communicate with other controllers, and accidentally open its associated valve. Clearly, the release pressure of vent valve 34 can be set at any value that ensures the safety of collection manifold 10, with gas exiting the valve being routed away from manifold 10. Additionally, the ports in chamber 12 may be disposed in many locations, depending on their individual uses. As an example, the regulated pilot gas pressure of chamber 12 is adjusted to between 5 psi and 6 psi during winter months, and between 3 psi and 4 psi during the summer when the main burner may not be required.

Figure 2:
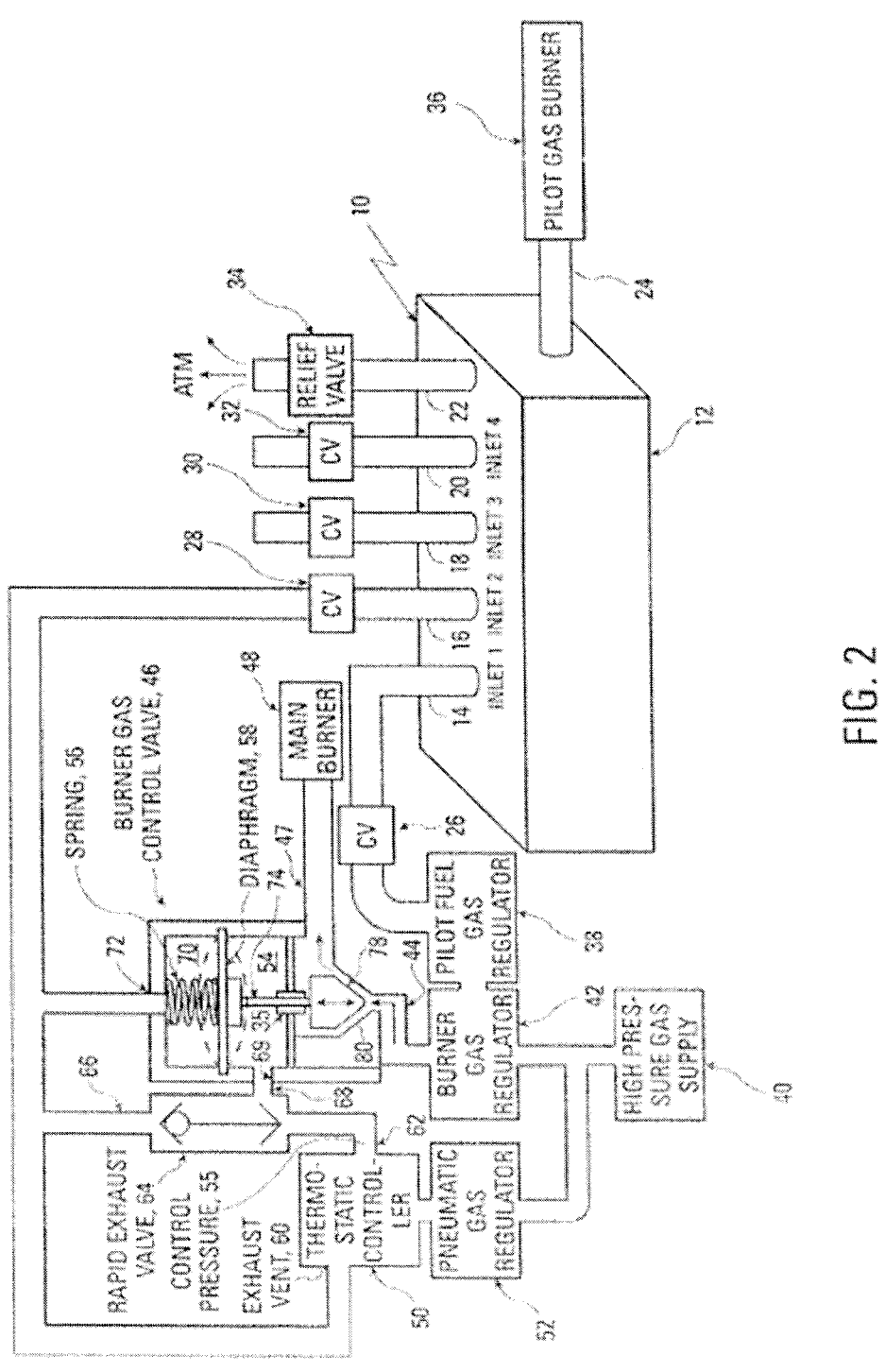
FIG. 2 is a schematic representation of a perspective side view of a burner control system for heating mixtures of produced oil and water for separation, as an example, including the manifold illustrated in FIG. 1 hereof having a single vent gas input for combustion, a pneumatic thermostatic controller for controlling the temperature of the heated mixture, and a modified burner gas flow valve in cooperation with a quick exhaust valve, for rapidly closing the flow valve.

FIG. 2 is a schematic representation of a perspective side view of manifold 10 in use with a burner control system for heating mixtures of produced oil and water for separation, as an example, which generates a single vent gas input to chamber 12 for disposal, the remaining vent gas inputs being available for other systems. Pilot gas burner, 36, is fed through burner orifice 24 from chamber 12, which is disposed downstream from pilot fuel gas regulator 38. High-pressure gas supply, 40, provides combustible gas at about 100 psi through burner gas regulator, 42, and subsequently through pilot fuel gas regulator 38 and check valve 26 to chamber 12. Burner gas regulator 42 also supplies gas through inlet, 44, of burner gas, gas-pressure operated, control valve, 46, which directs combustible gas through valve outlet, 47, to main burner, 48, as an example for heating the mixtures of produced oil and water for separation, not shown in FIG. 2. The temperature of the produced mixtures is controlled by thermostatic controller, 50, to which high-pressure gas (about 100 psi) is supplied from gas supply 40 through pneumatic regulator, 52. A chosen pressure of gas is supplied to lower chamber, 54, of burner gas control valve 46 as control pressure, 55, for counteracting the closing force of spring, 56. This control signal applied below diaphragm 58 permits burner gas control valve 46 to admit gas through outlet 47 to main burner 48. Once a predetermined temperature is reached in the mixture of produced oil/water, temperature controller 50 ceases to maintain burner gas control valve 46 in its open position by venting gas through exhaust vent 60, thereby reducing control signal 55 to a low pressure. The pressure at inlet port, 62, of quick exhaust valve, 64 is then reduced and the vented gas is directed to exhaust port 66 of quick exhaust valve 64, which causes the pressure in volume 54 below diaphragm 58 to rapidly drop as outlet port, 68, which is also inlet/outlet port, 69, to volume 54, vents gas through exhaust port 66 of rapid exhaust valve 64. The gas exiting exhaust port 66, and that from exhaust vent 60 of thermostatic controller 50 are in fluid communication with chamber, 70, of fluid control valve 46 above diaphragm 58, through port, 72, which increases the rapidity of closure of burner gas control valve 46 by now augmenting the force of spring 56 on diaphragm 58. Simultaneously with expanding into chamber 70, the exhaust gas enters Inlet 2 (16) of chamber 12 through check valve 28.

Diaphragm 58 of burner gas control valve 46 causes stem, 74, to move down and up through gasket, 76, thereby sealing plug, 78, against valve seat, 80, or permitting gas to enter burner gas control valve 46, respectively.

It should be mentioned that burner gas control valve 46 is commercially available. As sold, inlet port 69 to volume 54 of burner gas control valve 46, is an open, threaded port, whereas port 72 to volume 70 in burner gas control valve 46 is fitted with a closed, breathable protective plug, which is unscrewed and fitted with a gas fitting in accordance with the teachings of embodiments of the present invention.

Once chamber 12 is installed downstream of pilot gas regulator 44, the remaining vent inlets are connected to their individual controllers or other pneumatic devices to send their vent gases from the associated processing equipment to be combusted. Ports may be connected using ⅜ in. or ¼ in. tubing, as an example, to permit rapid flow from the venting pneumatic devices to chamber 12. Vent valve 34, controlling relief port 22, may be connected to ⅜ in. tubing routed to a chosen distance from main burner 48 for safety reasons.

In operation, most pneumatic vents routed to chamber 12 may begin to inject about 25 psi into chamber 12, which will overcome the 5 psi to 6 psi therein until a balance of 5 psi to 6 psi is attained. Although this lower pressure will remain in the pneumatic controllers, this pressure does not interfere with the normal operations of the controllers. In some situations, the venting pneumatic controllers will have only 5 psi pressure to exhaust into chamber 12, which is not possible. In such situations, the exhausting controller, for example, thermostatic controller 50, will be vented through exhaust vent 60 to exhaust port 66 of rapid exhaust valve 64. Since the control pressure 55, which appears at outlet port 68 has dropped to about 5 psi, the higher pressure will be released by rapid exhaust valve 64 through port 66 into upper chamber of 70 of burner gas control valve 46, which will still rapidly close burner gas control valve 46, thereby directly shutting down main burner 48, while permitting greater than 5 psi to enter chamber 12 through check valve 28.

Use of the combination of rapid exhaust valve 64 with burner control valve 46, thus permits the exhaust pressure of lower chamber 54 of burner gas control valve 46 to raise the pressure exiting exhaust vent 60 to the chosen pressure in chamber 12, and to rapidly close burner gas control valve 46. Additionally, the volume of chamber 70 provides additional volume to the venting gases, thereby permitting smooth transfer of the venting gas to chamber 12 without over-pressurizing chamber 12 and causing pressure release valve 34 to open and release unburned gas.

Although a natural gas burner for heating produced oil and water mixtures has been described as an exemplary gas-pressure-operated processing equipment, there is other production equipment to which embodiments of the present claimed invention are applicable. For example, a natural gas dehydration system, and a line heater have the same burner/pilot system as the present apparatus. Other equipment uses pneumatic controllers, which do not require a burner/pilot system. In such situations, the present manifold can be used, but without the need for pilot gas, and the pneumatic control gases can be collected and directed to natural gas disposal systems of other production equipment, or to a supplied catalytic heater to combust the gas, if there is no burner at the location.

Figure 3:
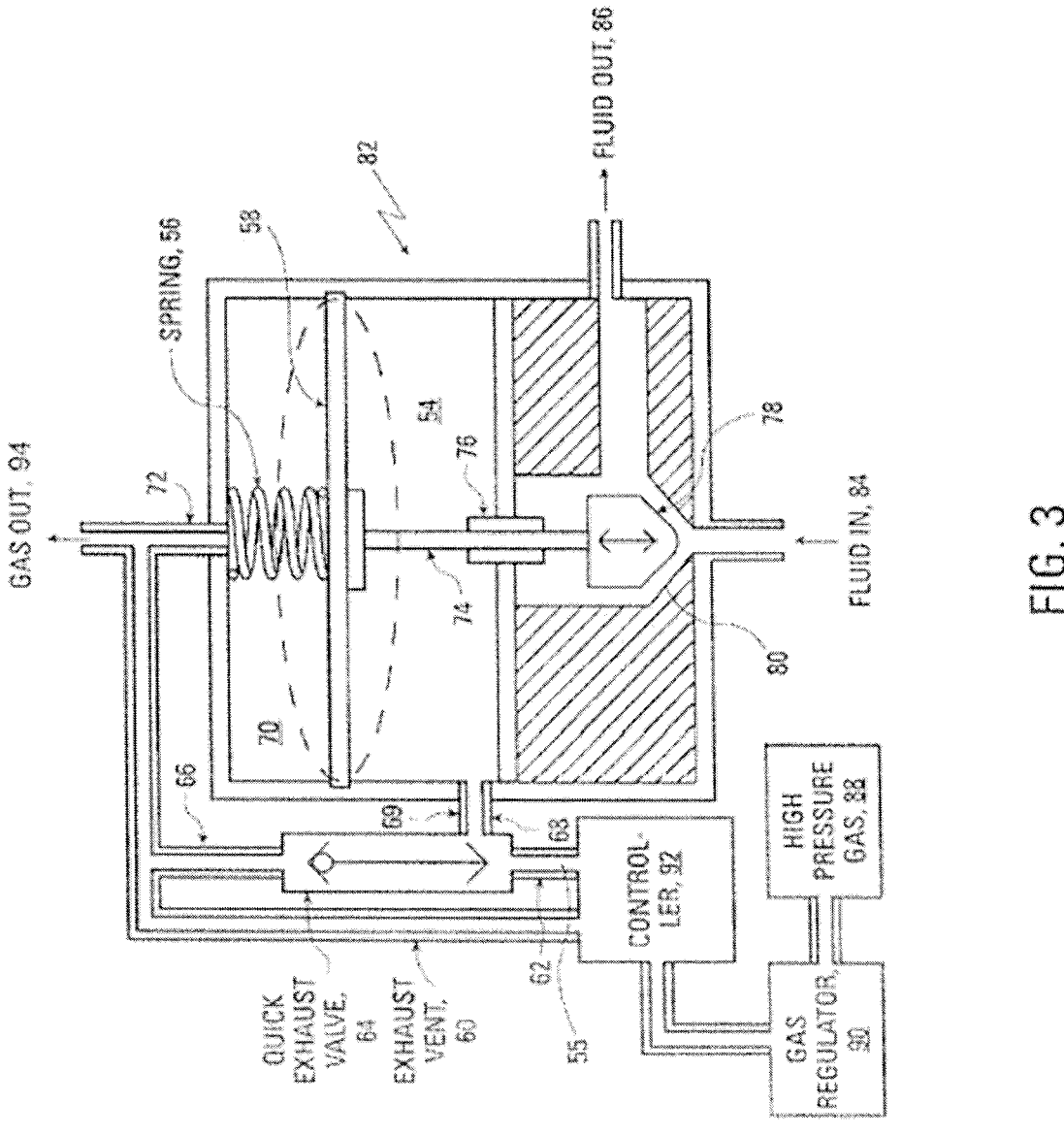
FIG. 3 is a schematic representation of a fluid flow valve, modified as in FIG. 2, in cooperation with a quick exhaust valve, for rapidly closing the flow valve, and terminating fluid flow therethrough.

More generally, turning to FIG. 3, a schematic representation of fluid flow control valve, 82, in cooperation with quick exhaust valve 64 is shown for generating rapid shut off of fluid flow from input port, 84, to output port, 86, of fluid flow control valve 82. The fluid may be gas or liquid. A chosen gas from high-pressure gas supply, 88, is directed into gas regulator, 90, and subsequently into controller, 92, for providing a selected pressure of gas to lower chamber, 54, of fluid flow control valve 82 as control pressure 55 for counteracting the closing force of spring, 56. This control signal, applied below diaphragm 58, directs fluid flow control valve 82 to permit fluid to flow between fluid inlet 84 and outlet 86. Once controller 92 ceases to maintain fluid flow control valve 82 in its open position by venting gas through exhaust vent, 60, thereby reducing control signal 55 to a low pressure, the pressure at inlet port, 62, of quick exhaust valve, 64 is reduced. The vented gas is then directed to exhaust port, 66, of quick exhaust valve 64, which causes the pressure in volume 54 below diaphragm 58 to rapidly drop as outlet port, 68, which is also inlet port, 69, to volume 54 of fluid flow control valve 82, vents gas in volume 54 through exhaust port 66 of rapid exhaust valve 64. The gas exiting exhaust port 66, and that from exhaust vent 60 of controller 92 are in fluid communication with chamber, 70, of fluid flow control valve 82 above diaphragm 58, through port, 72, which increases the rapidity of closure of fluid flow control valve 82 by now augmenting the force of spring 56 on diaphragm 58. Simultaneously with expanding into chamber 70, exhaust gas, 94, may be directed into Inlet 2 (16) of chamber 12 through check valve 28 (FIG. 2), or vented to the atmosphere, depending on the nature of the gas from high-pressure gas supply 88.

As stated above, diaphragm 58 of fluid flow control valve 82 causes stem, 74, to move down and up through gasket, 76, thereby sealing plug, 78, against valve seat, 80, or permitting gas to enter fluid flow control valve 82, respectively.

It should be mentioned that diaphragm 58 for both burner gas control valve 46 and fluid flow control valve 82 are shown to be operated by spring 56 and gases introduced into chambers 54 and 70. Fully pneumatic valves are well known, and operated without the use of a spring. By using quick exhaust valve 66 to rapidly increase the gas pressure of upper chamber 70 over that supplied by a pneumatic source, not shown in the FIGURES, it is anticipated by the present inventor that a similar rapid closure of the valve as obtained in accordance with the teachings of embodiments of the present invention will be attainable.

Figure 4:
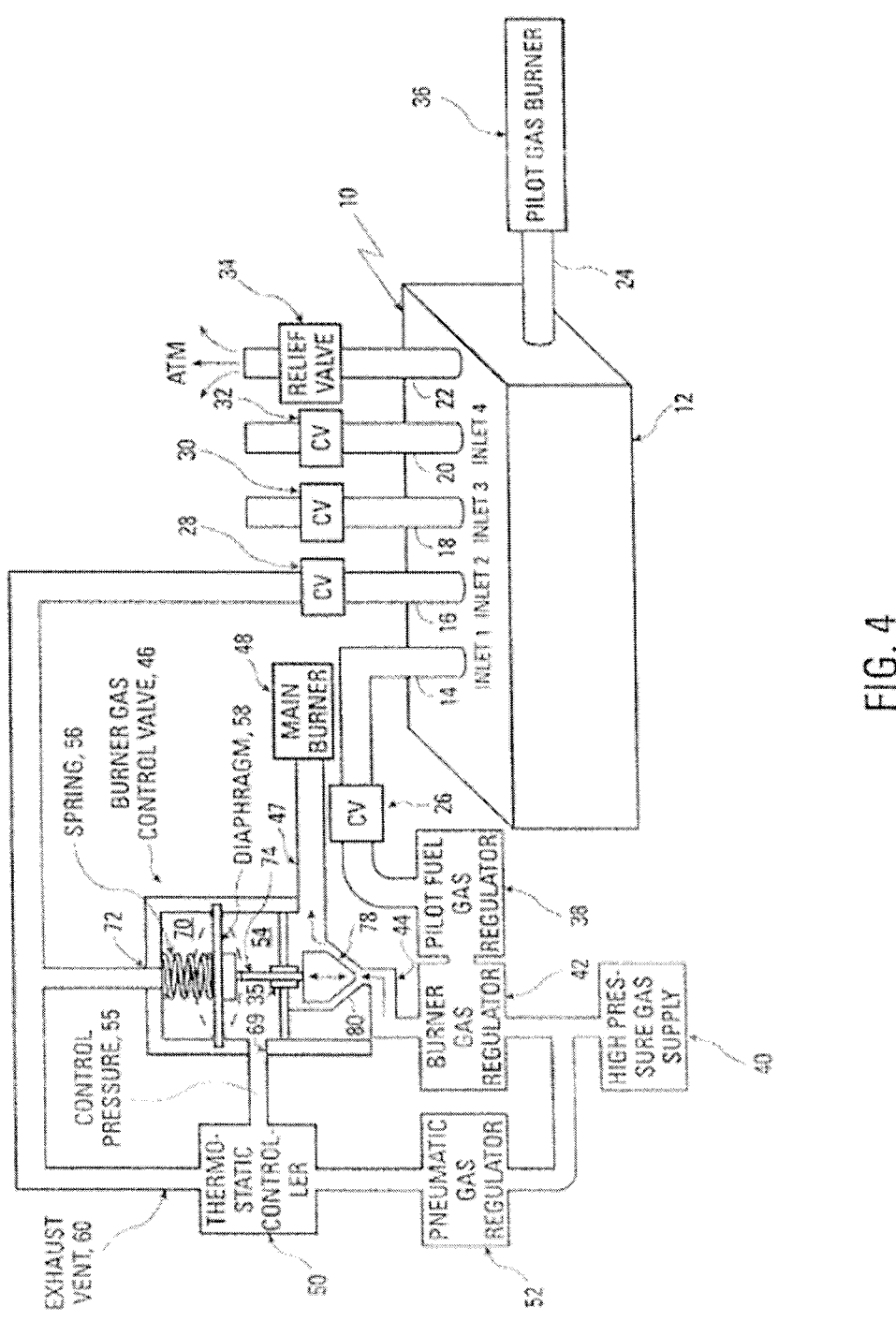
FIG. 4 is a schematic representation of a perspective side view of another embodiment of a burner control system for heating mixtures of produced oil and water for separation, as an example, including the manifold illustrated in FIG. 1 hereof having a single vent gas input for combustion, a pneumatic thermostatic controller for controlling the temperature of the heated mixture, and a modified burner gas flow valve in cooperation with the thermostatic controller for closing the flow valve.

In another embodiment of the present invention FIG. 4 is a schematic representation of a perspective side view of manifold 10 in use with a burner control system for heating mixtures of produced oil and water for separation, as an example, which generates a single vent gas input to chamber 12 for disposal, the remaining vent gas inputs being available for other systems. Unlike the embodiment in FIG. 2, modified burner gas flow valve 46 is now directly controlled using thermostatic controller 50, although the rate of closure of flow valve 46 is slower than when rapid exhaust valve 64 is employed. Similar to FIG. 2, pilot gas burner, 36, is fed through burner orifice 24 from chamber 12, which is disposed downstream from pilot fuel gas regulator 38. High-pressure gas supply, 40, provides combustible gas at about 100 psi through burner gas regulator, 42, and subsequently through pilot fuel gas regulator 38 and check valve 26 to chamber 12. Burner gas regulator 42 also supplies gas through inlet, 44, of burner gas, gas-pressure operated, control valve, 46, which directs combustible gas through valve outlet, 47, to main burner, 48, as an example for heating the mixtures of produced oil and water for separation, not shown in FIG. 4. The temperature of the produced mixtures is controlled by thermostatic controller, 50, to which high-pressure gas (about 100 psi) is supplied from gas supply 40 through pneumatic regulator, 52. A chosen pressure of gas is supplied to lower chamber, 54, of burner gas control valve 46 as control pressure 55 for counteracting the closing force of spring, 56. This control signal applied below diaphragm 58 permits burner gas control valve 46 to admit gas through outlet 47 to main burner 48. Once a predetermined temperature is reached in the mixture of produced oil/water, temperature controller 50 ceases to maintain burner gas control valve 46 in its open position by venting gas through exhaust vent 60, thereby reducing control pressure 55 to a low pressure, which causes the pressure in volume 54 below diaphragm 58 to drop as inlet/outlet port, 69, to volume 54 vents gas through thermostatic controller 50. Exhaust vent 60 of thermostatic controller 50 is in fluid communication with chamber, 70, of fluid control valve 46 above diaphragm 58, through port, 72, which increases the rapidity of closure of burner gas control valve 46 by now augmenting the force of spring 56 on diaphragm 58. Simultaneously with expanding into chamber 70, the exhaust gas enters Inlet 2 (16) of chamber 12 through check valve 28.

Figure 5:
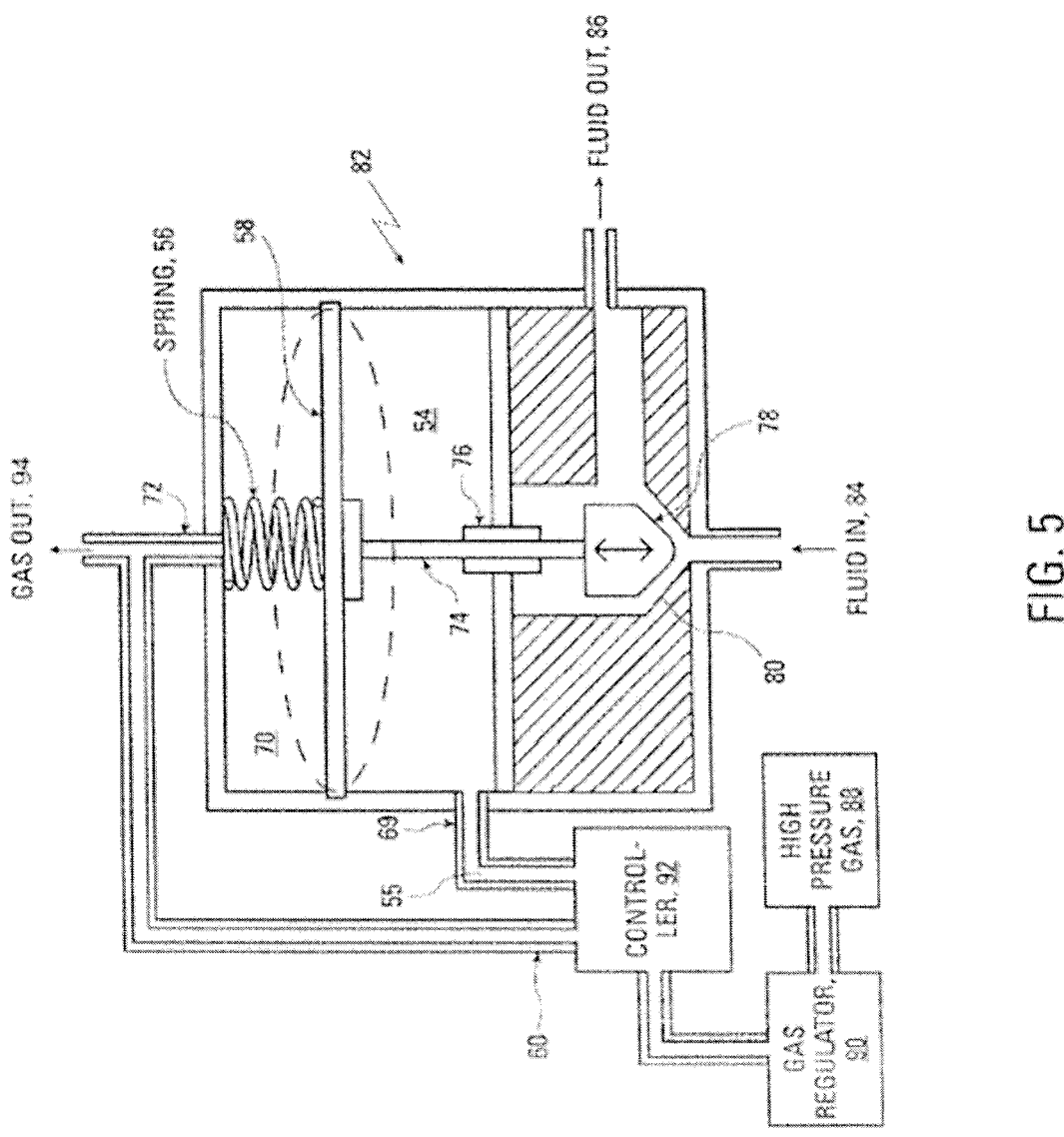
FIG. 5 is a schematic representation of a fluid flow valve, modified as in FIG. 4, in cooperation with a gas-operated controller for a chosen function, for closing the flow valve, and terminating fluid flow therethrough.

More generally, turning to FIG. 5, a schematic representation of fluid flow control valve, 82, directly controlled by pneumatic controller 92, for shutting off fluid flow from input port, 84, to output port, 86, thereof, although the rate of closure of flow valve 82 is slower than when rapid exhaust valve 64 is employed. The fluid may be gas or liquid. A chosen gas from high-pressure gas supply, 88, is directed into gas regulator, 90, and subsequently into controller, 92, for providing a selected pressure of gas to lower chamber, 54, of fluid flow control valve 82 as control pressure 55 for counteracting the closing force of spring, 56. This control signal, applied below diaphragm 58, directs fluid flow control valve 82 to permit fluid to flow between fluid inlet 84 and outlet 86. Once pneumatic controller 92 ceases to maintain fluid flow control valve 82 in its open position by venting gas through exhaust vent, 60, control pressure 55 drops to a low pressure, which causes the pressure in volume 54 below diaphragm 58 to drop as inlet/outlet port, 69, to volume 54 of fluid flow control valve 82, vents gas in volume 54 through pneumatic controller 92. The gas exiting exhaust vent 60 of controller 92 is in fluid communication with chamber, 70, of fluid flow control valve 82 above diaphragm 58, through inlet/outlet port, 72, which increases the rapidity of closure of fluid flow control valve 82 by now augmenting the force of spring 56 on diaphragm 58. Simultaneously with expanding into chamber 70, exhaust gas, 94, may be directed into Inlet 2 (16) of chamber 12 through check valve 28 (FIG. 4), or vented to the atmosphere, depending on the nature of the gas from high-pressure gas supply 88.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for combusting natural gas released from at least one natural gas-pressure-operated pneumatic controller, said at least one natural gas-pressure-operated pneumatic controller providing natural gas control pressure for operating natural gas-operated equipment, comprising:

a source of natural gas having a first pressure;

a first natural gas regulator for receiving natural gas from said source of natural gas, and for controlling the flow thereof into said at least one natural gas-pressure-operated pneumatic controller;

a second natural gas regulator for receiving natural gas from said source of natural gas for reducing the first pressure of natural gas to a chosen pressure;

a third natural gas regulator for receiving the chosen pressure of natural gas from said second natural gas regulator;

a gas-tight chamber having a first gas inlet for continuously introducing natural gas from said third natural gas regulator, and a second natural gas inlet for receiving natural gas released from said at least one natural gas-pressure-operated pneumatic controller, each of said first gas inlet and said second gas inlet having a check valve for directing natural gas flow into said gas-tight chamber; a gas-pressure relief valve, and a natural gas outlet port;

a natural gas burner for receiving natural gas from the natural gas outlet port, and for combusting the natural gas; and a gas control valve for providing natural gas to said natural gas-operated equipment from said second natural gas regulator, said gas control valve having a diaphragm disposed between a first gas-tight chamber and a second gas-tight chamber, a stem having a valve plug at one end, and a valve seat adapted to receive the valve plug disposed in the first chamber, and a spring disposed in the second chamber, said spring pressing against the diaphragm for engaging said valve plug with said valve seat, being counteracted by the natural gas control pressure from said gas-pressure-operated pneumatic controller in fluid communication with the first gas-tight chamber, whereby the flow of natural gas through said gas control valve is controlled; the second chamber being in fluid communication with the natural gas released from said at least one gas-pressure-operated pneumatic controller, for augmenting the spring pressing against the diaphragm.

2. The apparatus of claim 1, wherein said at least one natural gas-pressure-operated pneumatic controller comprises a thermostatic controller.

3. The apparatus of claim 1, wherein said gas-pressure-operated equipment comprises a natural gas burner for heating produced oil and water mixtures.

* * * * *